United States Patent [19]

Balasubramanian

[11] 4,387,994
[45] Jun. 14, 1983

[54] OPTICAL SYSTEM FOR SURFACE TOPOGRAPHY MEASUREMENT

[76] Inventor: N. Balasubramanian, 20361 Chalet La., Saratoga, Calif. 95070

[21] Appl. No.: 399,520

[22] Filed: Jul. 19, 1982

Related U.S. Application Data

[63] Continuation-in-part of Ser. No. 117,855, Feb. 4, 1980, Pat. No. 4,340,306.

[51] Int. Cl.$^3$ ............................................. G01B 11/24
[52] U.S. Cl. ...................................................... 356/360
[58] Field of Search ................................. 356/360, 354

[56] References Cited

U.S. PATENT DOCUMENTS

| | | | |
|---|---|---|---|
| 3,512,891 | 5/1970 | Baldwin | 356/360 |
| 3,694,088 | 9/1972 | Gallagher | 356/360 X |
| 3,937,580 | 2/1976 | Kasdan | 356/354 |
| 4,022,532 | 5/1977 | Montagnino | 356/360 |
| 4,225,240 | 9/1980 | Balasubramanian | 356/360 |

OTHER PUBLICATIONS

Malacara, "Optical Shop Testing" (Wiley), pp. 17–19.
Massie, N. A., "Quasi-Real-Time High Precision . . . Surfaces", SPIE, vol. 153, 1978, pp. 126–132.
Augustyn, Walker H., "Automatic Data Reduction . . . Patterns", SPIE, vol. 171, 1979, pp. 22–31.

Primary Examiner—Bruce Y. Arnold
Attorney, Agent, or Firm—Thomas Schneck

[57] ABSTRACT

An interferometric system for characterizing the surface of a test object, such as an aspheric surface. A white light interferogram is produced wherein the principal fringe indicates zero optical path difference between a test surface and a reference surface. Wavefronts from either of the test or reference surfaces are translated by incremental amounts. A multi-point detector array is used to make multi-point contrast readings. Points of contrast maxima for each detector point are computed by a statistical determination. A centroid function is preferred.

By recording the points of maximum contrast and the incremental wavefront translation, two dimensional plots showing zero optical path differences for the two surfaces are obtained, thereby comparing the test and reference surfaces.

3 Claims, 4 Drawing Figures

OPTICAL SYSTEM FOR SURFACE TOPOGRAPHY MEASUREMENT

CROSS REFERENCE TO RELATED APPLICATION

This is a continuation-in-part of application Ser. No. 117,855, filed Feb. 4, 1980, now U.S. Pat. No. 4,340,306.

TECHNICAL FIELD

The invention relates to an interferometric system for measuring the point-for-point distance deviation of an unknown surface from a known reference surface. The invention features a surface or a wavefront measuring interferometer system with a large measurement dynamic range. In particular, it deals with the method and apparatus for measuring optical path difference of a wavefront reflected from an unknown surface figure from that of a wavefront reflected from a known reference surface.

BACKGROUND ART

The use of interferometric systems for surface and wavefront measurement is well known in optics. In most of the automated interferomatic surface measurement systems, the geometry and the shape of the fringes produced are analyzed to obtain the required measurement data. Such measurement systems are particularly useful for measuring and testing aspheric lens surfaces. In recent years there has been considerable interest in making use of complex and higher order aspheric surfaces in optical system design.

Aspheric lenses are well known in optics. For many years, simple aspheric, such as parabolic surfaces, have been used in telescopes. More recently, computer controlled lens grinding machines have been able to produce complicated aspheric lens surfaces. Some of these complicated aspheric surfaces are for spatial compression of multi-element convex-concave lens systems. For example, in microscopes and cameras it has been the practice in the prior art to achieve desired corrections and magnifications by means of groups of lenses having specified concave or convex lens curvatures, refractive powers and spacings. Now, however, it is possible to produce a single aspheric lens which will replace a group of lenses.

When testing such surfaces using conventional interferometers, the density of the fringe pattern becomes too high and their shapes too complex to handle. A lack of good and simple means of testing such complex surfaces has been somewhat responsive for the delay in their widespread use. Even though the desired shape of a lens may be specified, it is difficult to determine when a precision surface has been attained. A precision surface is one having a point-for-point accuracy of the order of a fraction of a wavelength. The object of the present invention is to devise a method and apparatus for the testing of complex and higher order aspherical optical surfaces which are impossible to test based on existing testing methods.

In U.S. Pat. No. 4,022,532, issued May 10, 1977, Montagnino teaches use of a dual beam laser interferometer for comparing phases of multiple reflective spots on a test object. A reference beam, whose path length is modulated, is combined with the light reflected from the spots. Separate detector elements measure the interference pattern from at least two spots simultaneously. A shift in position of one spot relative to a reference spot is determined by measuring the phase shift between spots. Using this approach, the surface configuration of an optical surface may be monitored.

In U.S. Pat. No. 3,694,088, issued Sept. 26, 1972 Gallagher et al. teach use of a dual beam laser interferometer for the study of intensity changes in a fringe pattern by means of a TV camera. The pattern intensity is changed twice by rotation of a quarter-wave plate, producing two known phase shifts. By storing pattern intensity values before and after the rotations, the intensity values can be correlated with the phase shift to solve simultaneous equations which yield phase and amplitude plots for the wavefront from the object under study.

In my prior patent application, Ser. No. 912,212, now U.S. Pat. No. 4,225,240 granted Sept. 30, 1980, an interferometric method is disclosed for measuring the optical path difference between a test surface and a reference surface. The method consists of varying the interferometric optical path length difference between a reference and a test surface in three steps at one-quarter wavelength intervals. Next, the intensity of the interferogram radiation is sensed at least at one position of the interferogram for each of the steps. The intensity sensed at each position and at each step is stored. For each of the positions the intensity of the first and third steps is added to produce a d.c. spatial frequency amplitude, and the intensity of the second step is subtracted from the d.c. amplitude to produce the sinusoidal spatial frequency amplitude. The sinusoidal and cosinusoidal amplitudes are combined to produce a trigonometric function of the phase angle of the radiation reflected from each position of the reference and test surfaces. This function is representative of the optical path length difference at each position. A multi-aperture CCD detector is used to detect intensity changes of the fringes. An advantage of my prior invention is that the sign of optical path differences may be determined, depending on whether the d.c. amplitude is larger or smaller than twice the intensity at the second step.

In the book "Optical Shop Testing" by Malacara (Wiley, publisher), p. 17, a procedure is described for determining the deviation of an aspheric surface from a spherical surface or an irregular surface from a reference flat surface. One surface is placed atop the other so that an optical path difference between the two will produce fringes when illuminated by a monochromatic source.

In an article entitled "Quasi-Real-Time High Precision Interferometric Measurements of Deforming Surfaces" in SPIE, Vol. 153 (1978) p. 126, Massie describes a system wherein two beams with orthogonal polarizations are shifted in frequency by different amounts using acousto-optic devices. The reference surface receives one polarization and frequency and the test surface the other. With appropriate optics the phase of one beam is compared to the other so that optical path differences can be mapped.

In an article entitled "Automatic Data Reduction of both Simple and Complex Interference Patterns" in SPIE, Vol. 171 (1979) W. Augustyn discloses a computer fringe pattern analysis method whereby points on a reference interferogram representing zero path difference are placed in memory. Next, a test interferogram is generated and the stored points are subtracted from the actual. The difference between the two patterns is a new interferogram for user study.

White light interferometry has also been used for monitoring surfaces and surface profiles, but its application has been limited to interferometric objective lenses. The use of white light enables one to identify the zero-order fringe as the white light fringe and hence permits quantitative, but manual reduction of interferograms. This is extremely important when surface discontinuities are involved. Several microscope objectives that are capable of producing white light fringes on micro specimens are commercially available and they are typically used for measuring the film thicknesses and monitoring surfaces with discontinuities several wavelengths deep. Unlike other interferogram analyzers cited earlier no attempt has been made to automate the detection and interpretation of white light fringe patterns.

An object of the invention is to provide a simple and direct method for precision characterization of unknown surfaces which does not require visual fringe interpretation and which is suited to the measurement of discontinuous and steeply contoured aspheric surfaces.

DISCLOSURE OF INVENTION

The above object has been achieved in a test surface measuring system which features a white light dual beam interferometer. One beam has wavefronts reflected from the unknown test surface of a test object, while the other beam has reference wavefronts from a reference surface. Zero order fringes produced by interference of the two beams represent zero path differences, thereby indicating point coincidences between the reference surface and the test surface. A zero order fringe exhibits maximum contrast which is identified by modulating the phase of the reference wavedfront by a predetermined amount. An array of points on the test surface may be measured by scanning the interference pattern, point by point, and recording contrast variations by means of a multi-aperture CCD detector, with a CCD aperture or diode corresponding to each test point. If a maximum contrast level is observed by an aperture, that point is recorded as having zero path difference with respect to the reference surface.

After all of the points of the test surface have been scanned, the reference surface is moved by a predetermined very small amount and the process is repeated. After all points have been scanned, the test surface is again moved, and so on, with the objective of locating points of maximum contrast.

To find points of maximum contrast, a calculation is made involving all intensity levels detected at each detector aperture for all increments of motion. This calculation, similar to a centroid determination, identifies one aperture or point of maximum statistical importance for each detector aperture which is defined as the point of maximum contrast. The maximum contrast level is recorded, together with the slice number indicating where the maximum contrast level occurred. Detector apertures where maximum contrast occurs correspond to points of zero path difference relative to the reference surface, offset by an amount that the test surface was moved. Since the extent of test surface movement is known from the slice number, the pointwise distance deviation of the test surface from the reference surface is known for each test point corresponding to a detector aperture.

Advantages of the invention are as follows: (1) the measurement method relies on maximum contrast to establish zero path difference and thus constitutes a direct measurement of a surface, as opposed to indirect fringe interpretation methods; (2) the method may be used for non-regular reflective surfaces, such as semiconductor integrated circuits, as well as for aspheric optical surfaces, including steep aspheric surfaces.

BEST MODE FOR CARRYING OUT THE INVENTION

Figure 1:
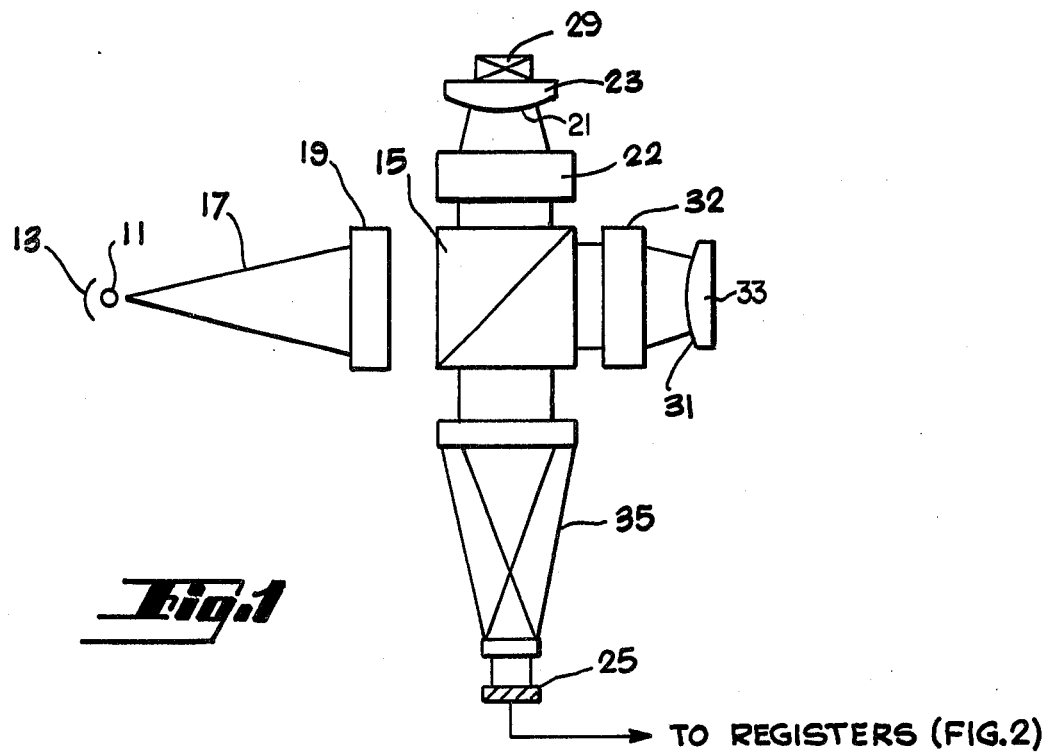
FIG. 1 is a plan view of an apparatus for use in the method of the present invention.

With reference to FIG. 1, a scanning dual beam interferometer of the Twyman-Green type is shown. Such interferometers have previously used laser or monochromatic sources. The long coherence length of these sources produced fringe patterns over an entire surface which were useful in interferometric measurements of surface contours. In contrast with prior practices, it has been discovered that for purposes of the present invention, the fringe patterns over the entire surface are not useful because the number and spacing of fringes makes fringe detection difficult.

It has been known that when a broad-band source is used in an interferometer, as compared to a monochromatic source, the fringes are formed only when the optical path difference between the interfering wavefronts, D, is small. When the source bandwith is comparable to the mean wavelength, the fringe contrast reduces to a minimum, i.e., when the path difference is equal to the mean wavelength. This information is valuable since it permits one to detect optical path differences by measuring the fringe contrast. An ability to detect a fractional change in fringe contrast, say ten percent, will result in surface definition of 0.1 of the mean wavelength. The measurement of the contrast of white light fringes provides a means of identifying regions of a test wavefront that differ from the reference wavefront by no more than the specified amount, say 0.1 wavelength, as a definition of equal phase contours.

With reference to FIG. 1, such a white light point source is located at region 11, in front of reflector 13 facing the beam splitter 15. The source may be a common incandescent high intensity lamp which projects a diverging beam 17 which is collimated by a collimator 19 prior to entering beam splitter 15. One portion of the beam is directed to the reference surface 21 of a reference object 23 through a focusing lens 22. The reference surface 21 has a precisely known topography, such as being spherical to within 0.05 wavelength. The surface need not be spherical and may have another precision shape, such as being flat. Under such conditions the focusing lens 22 is not used. Light is reflected from the reference surface 21 and passes through beam splitter 15 and through a focusing telescope 35 to a detector, such as diode array 25 which will be discussed below.

Another portion of beam 17 pssses through beam splitter 15 and through a focusing lens 32, identical to focusing lens 22, to the unknown test surface 31 of an object 33 such as an aspheric lens. Light which is reflected from the unknown surface 31 is also directed by beam splitter 15 to the diode array 25. Both the reference wavefront from the reference surface 21 and the test wavefront from the test surface 31 pass through the focusing telescope 35. Telescope 35 produces a flat field image of the test and reference surfaces onto the diode array 25. The size of the image corresponds to the size of the detector.

The reference surface 21 and the test surface 31 must be slightly reflective to white light, at least 1%, so that an interference pattern can be formed. If one of the surfaces is completely absorptive of white light, it must be made slightly reflective, perhaps by means of a reflective coating, so that measurements can be made in accord with the present invention.

A piezoelectric transducer 29 is positioned behind the reference lens 23. The purpose of the transducer 29 is to translate the reference lens by incremental distances on the order of 1 micron. The transducer may translate lens 23 first in one direction, say 50 microns and then in the opposite direction by 50 microns for a total of 100 microns. To accomplish this, first a positive d.c. voltage is applied to the transducer in incremental amounts and then a negative d.c. voltage is applied to the transducer in equal but opposite incremental amounts. Piezoelectric transducers respond in well-known ways to such d.c. voltages and commercially available transducers for moving mirrors are frequently used for the purpose of adjusting laser mirrors. The initial position of the reference mirror 21 is in a position of estimated zero path difference with respect to test surface 31. The reason for this is that the deviations of the test surface from the reference surface will fall on either side of the initial position. Alternatively, the initial position could be above or below the position of zero path difference and the reference surface moved in only one direction until all corresponding points of zero path difference have been found. As previously mentioned, points of zero path difference are identified by contrast maxima in apertures or diodes of the CCD detector array. Such contrast maxima are actually interference fringes, but are not observed as fringes. Rather, the contrast maxima corresponding to points of zero path difference relative to the reference surface, offset by an amount that the test surface has been moved. It is therefore important to record test surface incremental movement so that the pointwise deviation of the test surface from the reference surface is known for each test point. The detector array reads all test points for each incremental amount of test surface translation. Each reading of the detector array may be thought of as an observation of a horizontal slice of the test surface. The number of slices will equal the number of incremental translations of the test surface. The amount of translation is typically a fraction of the mean wavelength of light, 1 micron in the example above, but greater or smaller translations may be used, depending upon the desired resolution of the test surface and the amount of computing capability available for determining contrast maxima and recording such information. The extent of test surface incremental motion also depends upon the range over which the phase of the reference wavefront can be scanned by the detector array with a desired amount of accuracy.

The information which is recorded consists of multipoint data in a two-dimensional slice or slices having a resolution which corresponds to the spacing and the aperture of the diodes in the diode array 25. Output data characterizing an unknown test surface consists of position information regarding contrast maxima within the diode array plus the step level. The shape of the test wavefront with respect to the reference wavefront is mapped by considering the points of the diode array at which maximum contrast has been recorded on each slice. Maximum contrast points on all such slices completely characterize the unknown surface. A precision of the order of 0.025 micron is easily obtained using the zero order fringe scanning method described herein. In the description of the method of the present invention, both the a.c. or oscillatory motion provided to the reference surface 21, as well as the d.c. or step translation of the reference surface 21 necessary to provide the incremented zero path differences for the test surface 31 have been generated by a single piezoelectric transducer 29. Alternatively, a separate transducer could be provided behind object 33 to provide either the a.c. component or the d.c. component, while the first transducer 29 produced the remaining component.

The range of deviation of the test surface from that of a reference surface that can be measured using this measurement concept depends on the range over which the phase of the reference wavefront can be scanned with the desired accuracy. Hence it is ideally suited for measuring non-regular reflective surfaces and steep aspheric surfaces.

The apparatus of FIG. 1 is especially useful for relatively small test surfaces, ranging from less than 1 millimeter to several centimeters in width. In general the reference surface is matched, as closely as possible with an unknown test surface. For example, a convex aspherical test surface is matched with a convex spherical reference surface. A concave aspherical test surface is matched with a concave spherical reference surface. A continuous or discontinuous near-planar test surface is matched with a planar reference surface.

Figure 2:
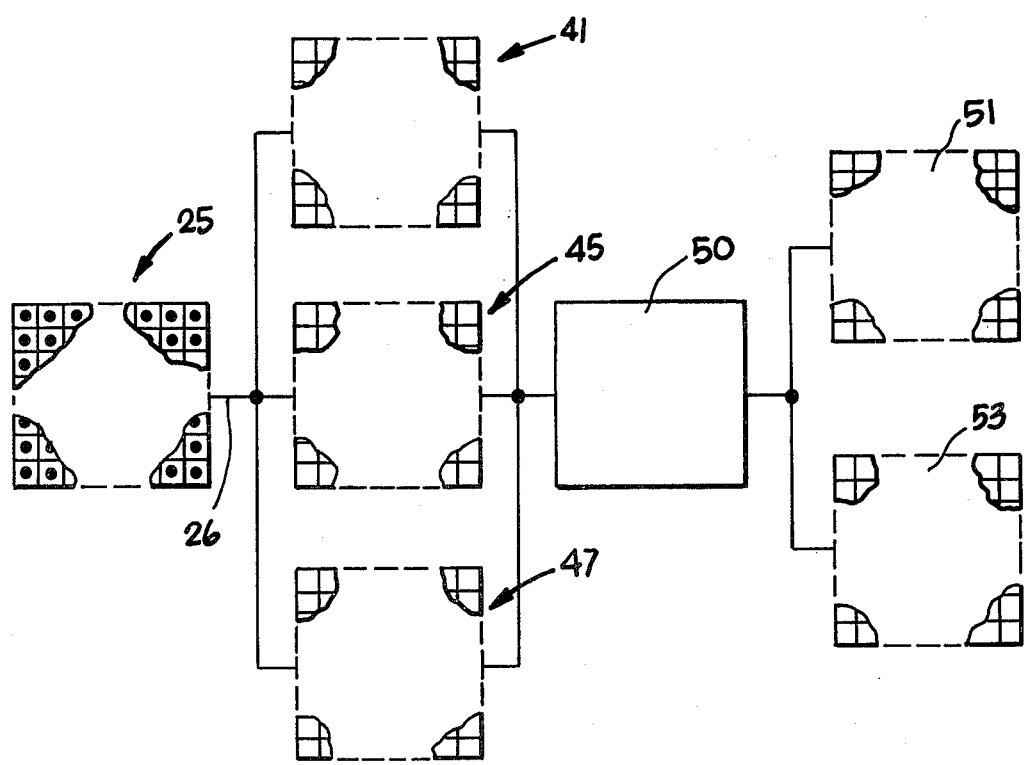
FIG. 2 is a simplified plan view of registers for data processing in accord with the method of the present invention.

Data acquisition for the method of the present invention may be understood in more detail with reference to FIG. 2. Typically, the CCD array 25 would be a rectangular or square grid of diodes or apertures 37, each aperture being mutually spaced and equidistant from all neighboring apertures. In FIG. 2, a typical array is shown having 100 apertures or diodes to a side or a total of 10,000 diodes. A typical size for such an array would be approximately 2 centimeters on a side. Such diode arrays are known as solid state self-scanning image photodetector arrays, such as Fairchild CCD 211; RCA 320 X512 CCD; Reticon RA-32X32A; and IPI 2D1. The array is usually scanned by sensing the intensity signal level of each detector element, one at a time, in sequence. Each diode is connected to a capacitor, such that diode conduction in response to light impinging on the diode causes a corresponding voltage drop charging a connected capacitor. The capacitor retains its charge long enough to be sensed. The voltage on the capacitor is proportional to the light intensity sensed by the diode.

As previously mentioned, the path difference between the test surface and the reference surface is translated by a slight amount, say 0.1 wavelength. The amount of path length difference yields the ultimate mapping accuracy. Mapping at accuracies greater than 0.1 wavelength is possible because the path length difference may be adjusted by miniscule amounts, using the piezoelectric transducer 29. Variations as small as one or two atomic layers are theoretically possible. For a test surface having a depth of 50 wavelengths to be scanned, 500 levels, each 0.1 wavelength apart, are necessary. Of course greater or smaller levels can be taken, using larger or smaller separations. The smaller the separation, the greater the resolution and the measurement time.

One of the problems which occurs in carrying out the present invention is in determining contrast maxima. With very small incremental translations of the reference surface, the contrast changes appear sinusoidal, with peaks of approximately equal amplitude. Contrast maxima are determined in the following way. FIG. 2 indicates that the detector array 25 has an information output, a signal converted to digital form representing the amplitude of the light level for each diode. This group of signals is transmitted along line 26 to difference registers. It should be understood that FIG. 2 is highly schematic, but that the method of determining contrast maxima will be understood with reference to the simplification of the figure. Three registers 41, 45 and 47 are provided, each register consisting of a memory array having a storage location corresponding to each of the diodes in the detector 25. Storage array 41 stores the initial value of each detector, designated $x_o$. Register 47 stores a running total of the value $|x-x_o|$ which is defined as the function f(s). The value of this function is stored in locations within register 47, one location corresponding to each of the diodes in the detector 25. The number of storage locations corresponds to the number of storage locations in register 41.

The third register 45 stores the value of the function f(s) multiplied by the slice number, a new function defined as Sf(s). Once again, the value of this function is computed for each diode of detector 25 with the number of storage locations in the register 45 corresponding to the number of storage locations in registers 41 and 47.

To determine a contrast maxima, a calculation is used which gives a meaningful statistical weighting to the various values of $|x-x_o|$. The contrast maximum for each point is defined in terms of a centroid calculation using the formula $$\frac{\Sigma Sf(s)}{\Sigma f(s)} = \bar{x}.$$

Using this formula a value x may be calculated for each diode in the detector. The value which is found is identified with the slice number where such a value, or the nearest value to it, is located. Upon performing such a calculation, two values are ultimately recorded, one being the value of the contrast maximum for each diode detector which is stored in register 51 and the slice number where the maximum occurs, stored in register 53. Other statistical functions might be used to define contrast maxima, but the centroid function has been found to be preferred because it gives appropriate weighting to nearby contrast maxima.

At points of contrast maxima, zero path-length differences occur with respect to the reference surface. Thus, information in the contrast register 51 and the step register 53 provides two dimensional slices indicative of where zero optical differences exist relative to the reference surface. By knowing the shape of the reference surface, a direct comparison may be made between the reference surface and the deviation of the test surface therefrom. Registers 41, 44, 47, 51 and 53, as well as controller 50 may be part of a single computer system or separate units.

The data processing system and method described herein has the advantage that only a limited amount of data is stored. Assuming 500 levels to be scanned with 50 scans per diode and a total of 10,000 diodes, as in detector 25, approximately 250 million data points will be examined. But, using the data processing method described herein, only 40,000 points are ultimately recorded using that information, two for each diode with one point being the contrast maximum value, the other being the level at which the contrast maximum value occurred.

The measurement technique described above using two-beam interferometers, such as a Twyman-Green interferometer, can also be carried out with common path interferometers. In two-beam interferometers the reference and test beams travel widely separated paths and hence are differently affected by vibration and air turbulence. This problem is severe particularly when large aperture optical systems are involved. In common path interferometers, the reference and test beams traverse the same general path and hence are not greatly affected by problems of turbulence and vibration.

Figure 3:
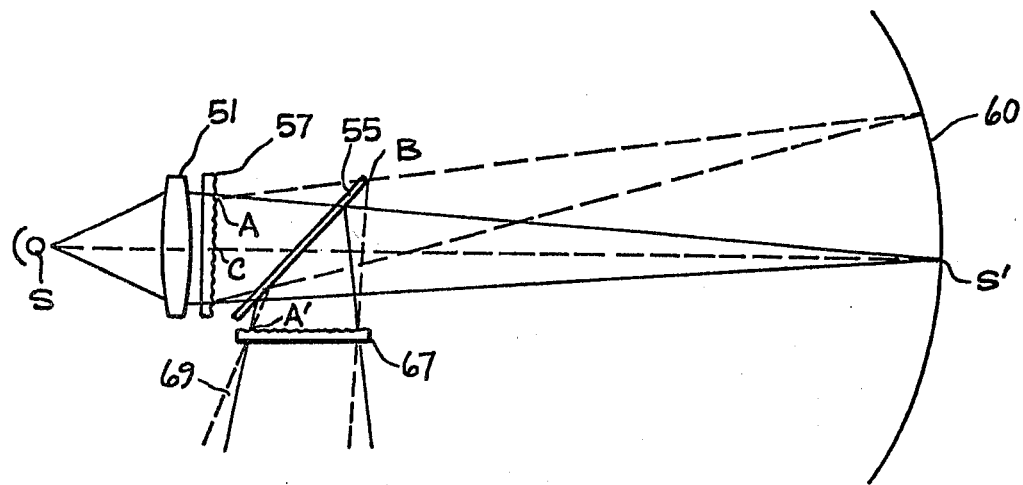
FIG. 3 is a plan view of a scatter plate interferometer of the prior art.

An example is the scatter plate interferometer shown in FIG. 3 and as further described in the book "Optical Shop Testing" by Malacara, page 818. The lens 51 forms an image of a small white light source S at region S' on the mirror being tested. The scattering of the image beam by the scatter plate 57 forms several point source images over the rest of the test mirror 60.

The test mirror 60 forms an image of the scatter plate 57 onto an identical scatter plate 67, which is placed so that there is point-for-point coincidence between scatter plates 57 and 67. A part of the light incident on the scatter plate 57 passes through it without scattering and arrives at region S'. Since this beam touches the mirror 60 only at a small region around S', it is not affected by the errors of the mirror surface. This beam acts as the reference beam. Some of the incident light is, however, scattered by scatter plate 57 and fills all of the aperture of mirror 60. This beam picks up the errors of the mirror and is the test beam.

Consider a ray incident at a point A on the scatter plate 57. The directly transmitted ray, the solid line in FIG. 3, follows the path through half mirror 55 designated by the letters AS'A'. After reflection downwardly from mirror 55, the ray encounters at image point A' a scattering center that is identical to the one at A. This ray is scattered at A' and gives rise to a cone of rays 69. The rays scattered at A, dotted lines, fill the mirror 60, arrive at the image point A', and pass through scatter plate 67 without scattering. Thus we have two mutually coherent beams emerging from scatter plate 67; one beam is directly transmitted by scatter plate 57 and scattered by scatter plate 67, and the second is scattered by scatter plate 57 and transmitted by scatter plate 67. An observer looking at the mirror surface 60 through scatter plate 67 will see an interferogram between these two beams. If the mirror is free of any error in the region of S', the interferogram will provide explicit information about the mirror aberrations, as in any separate-beam inferferometer.

Figure 4:
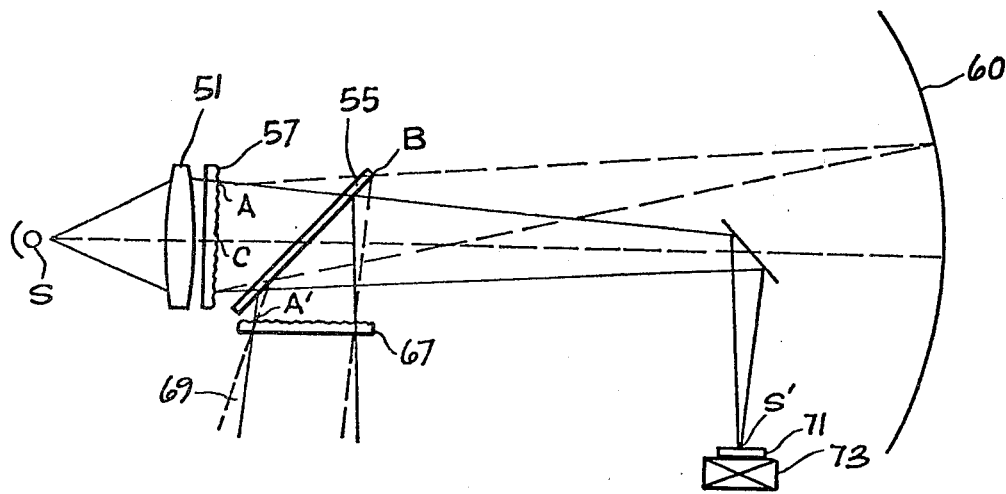
FIG. 4 is a plan view of a modified scatter plate interferometer in accord with the present invention.

This configuration can be slightly modified as shown in FIG. 4 to make use of the measurement method described in this invention. The reference beam, instead of being reflected by the center of the test mirror, is reflected by a piezo driven reference plane mirror 71. By translating the reference plane mirror 71 with a piezoelectric crystal 73, a zero path difference condition can be established for different zones of the test surface. Translational motion is used as previously described. The motion of the reference mirror, as in the two-beam interferometer, described with reference to FIG. 1, once again provides a means of quantitatively defining the test surface. Note that in FIG. 4 the reference surface figure is a vertex sphere of the test surface. This adaptation of the measurement technique is very important since it permits its use in cases involving large and steep astronomical mirror surfaces.

One type of non-regular reflective surface constitutes semiconductor integrated circuits, prior to packaging. Sometimes these circuits are existing on wafers, prior to scribing and breaking into individual units. Other times, the individual circuits are mounted on a carrier or holder. In either case, a beam from the beam splitter may be reflected from the surface and caused to form an interference pattern with the wavefront from the reference surface. The reference surface could be an optical flat and the deviations which are measured would be those of mesas formed by coatings having different step heights. Such step heights occur because of masking certain portions of the circuit and then dissolving or etching unmasked portions. There are also other reasons for these step heights. In semiconductor manufacturing, it is important to measure the step heights for quality control, research and failure analysis purposes.

In this application the references to wavelengths and fractions thereof refer to the mean wavelength of the white light source.

I claim:

1. A non-contacting method for measuring deviations between a reference wavefront representing a reference surface and a test wavefront representing a test surface comprising, establishing a white light interference pattern on a detector between two wavefronts, one wavefront from at least one point on a reference surface of known topography and another wavefront from a corresponding point on a test surface of unknown topography, repeatedly translating one of the wavefronts from said surfaces by known incremental distances relative to the detector from a starting position and establishing other white light interferences patterns, one for each translation, while establishing zero optical path differences between wavefronts from locations on the reference surface and corresponding locations on the test surface of unknown topography, reading light intensity levels at a number of sample points of the interference pattern for each translation, calculating a statistical function indicative of the contrast maximum for each of the sample points of the interference pattern over the range of wavefront translation, recording the positions of calculated maximum fringe contrast and the corresponding incremental distance of surface translation relative to the starting position for each sample point, whereby the points of maximum fringe contrast at a given step represent points, the locus of which defines contours for which there is zero optical path difference between the test surface and the reference surface.

2. A non-contacting method for measuring deviations between a reference surface and a test surface comprising, (a) establishing a white light interference pattern on a detector array for zero optical path difference between two wavefronts, one wavefront from at least one point on a reference surface of known topography and another wavefront from a corresponding point on a test surface of unknown topography;

(b) repeatedly translating one of the wavefronts from said surfaces by known incremental distances relative to the detector from a starting position and establishing other white light interference patterns, one for each translation, while establishing zero optical path differences between wavefronts from locations on the reference surface and corresponding locations on the test surface of unknown topography;

(c) repeatedly sampling detector points of the detector array;

(d) storing in a first register intensity values, $x_o$, at detector points in the starting position;

(e) storing in a second register f(s) where f(s) equals $\epsilon |x-x_o|$, with x being the intensity at the detector points other than at the starting position;

(f) storing in a third register Sf(s) where S is the incremental slice number;

(g) computing the centroid function $$\bar{x} = \frac{\Sigma Sf(s)}{\Sigma f(s)}$$

for all points on all slices where x is the computed intensity maximum for each point and storing said values of x in a fourth register;

(h) storing in a fifth register, for corresponding positions in said fourth register, a step number representing an incremental distance at which the contrast maxima values, x in the fourth register occurred, whereby maximum contrast values indicate equal phase contours for establishing zero optical path differences between said test and reference surfaces.

3. An apparatus for measuring deviations between a reference surface and a test surface comprising, a white light interferometer having a mean wavelength of white light for producing an interference pattern from interfering wavefronts from a test surface and a reference surface;

means for varying the optical path length difference for interfering wavefronts between said test and reference surfaces by known incremental distances;

a detector positioned for sensing the intensity of said interfering wavefronts, said detector having a plurality of detector elements therein, means for scanning said plurality of detector elements at each incremental distance to obtain from each cell signals representative of intensity, a first register having cells for storing intensity values, $x_o$, for each detector element in the detector starting position, a second register having cells for storing f(s) where f(s) equals $\epsilon |x-x_o|$, with x being the intensity at the detector points other than at the starting position, a third register having cells for storing Sf(s) where S is the incremental slice number, means for computing the centroid function $$\bar{x} = \frac{\Sigma Sf(s)}{\Sigma f(s)}$$

for all points on all slices were x is the computed intensity maximum for each point, a fourth register having cells for storing the computed intensity maxima, x, and a fifth register having cells for storing the step number representing an incremental distance at which the contrast maxima values, x, in the fourth register occurred, whereby maximum contrast values indicate equal phase contours for establishing zero optical path differences between the test and reference surfaces.

* * * * *